United States Patent [19]
Nishikawa

[11] Patent Number: 5,616,979
[45] Date of Patent: Apr. 1, 1997

[54] VIBRATION DRIVEN MOTOR APPARATUS

[75] Inventor: Fumikazu Nishikawa, Yokohama, Japan

[73] Assignee: Canon Kabushiki Kaisha, Tokyo, Japan

[21] Appl. No.: 661,883

[22] Filed: Jun. 11, 1996

Related U.S. Application Data

[63] Continuation of Ser. No. 453,574, May 26, 1995, abandoned, which is a continuation of Ser. No. 165,898, Dec. 14, 1993, abandoned.

[30] Foreign Application Priority Data

Dec. 16, 1992 [JP] Japan ................................. 4-335842

[51] Int. Cl.⁶ ........................................ H02N 2/00
[52] U.S. Cl. ............................ 310/316; 310/323
[58] Field of Search ...................... 310/316, 323; 318/116

[56] References Cited

U.S. PATENT DOCUMENTS

| | | | |
|---|---|---|---|
| 4,914,336 | 4/1990 | Yamasaki | 310/316 |
| 5,001,442 | 3/1991 | Hanaie et al. | 310/316 |
| 5,023,526 | 6/1991 | Kuwabara et al. | 310/316 |
| 5,061,882 | 10/1991 | Takagi | 310/316 |
| 5,136,215 | 8/1992 | Izukawa | 310/316 |
| 5,146,143 | 9/1992 | Furutsu | 310/316 |
| 5,159,253 | 10/1992 | Shimizu et al. | 310/316 |
| 5,214,339 | 5/1993 | Naito | 310/316 |
| 5,258,694 | 11/1993 | Ohnishi et al. | 310/316 |

FOREIGN PATENT DOCUMENTS

| | | | |
|---|---|---|---|
| 62-85684 | 4/1987 | Japan | H02N 2/00 |
| 1-283073 | 11/1989 | Japan | H02N 2/00 |

*Primary Examiner*—Thomas M. Dougherty
*Attorney, Agent, or Firm*—Fitzpatrick, Cella, Harper & Scinto

[57] ABSTRACT

This invention relates to a vibration driven motor apparatus and, more particularly, provides a motor apparatus which has a mode for setting the rate of change in frequency in correspondence with the motor speed, and a mode for setting the rate of change in correspondence with the difference between a resonance state and a current vibration state when the frequency of a driving frequency signal in the motor is changed, and selects one of these modes in correspondence with the motor speed.

17 Claims, 10 Drawing Sheets

VIBRATION DRIVEN MOTOR APPARATUS

This application is a continuation of application No. 08/453,574, filed May 26, 1995, now abandoned, which is a continuation of application No. 08/165,898, filed Dec. 14, 1993, both now abandoned.

BACKGROUND OF THE INVENTION

1. Field of the Invention

The present invention relates to a driving control apparatus for a vibration driven motor or actuator for performing driving control of a so-called vibration driven (vibration wave) motor comprising, e.g., electrostrictive elements, piezoelectric elements, and the like.

2. Description of the Related Art

In order to efficiently drive a vibration wave motor, it is desirable to drive the motor at a mechanical resonance frequency. In order to perform such a driving operation, conventionally, a method of controlling the frequency to obtain a constant phase difference between a signal from a monitor electrode for detecting the vibrating state of the motor, and a driving AC signal is proposed in, e.g., Japanese Patent Application No. 60-226566, (corresponding to Japanese Laid-Open Patent Application No. 62-85684).

In order to obtain various rotational speeds from the motor, the motor is generally driven at frequencies other than the resonance frequency. In this case, the motor is normally driven at a frequency higher than the resonance frequency.

More specifically, when the rotational speed of the motor is changed, a method of controlling the rotational speed of the motor by arbitrarily setting a frequency higher than the resonance frequency is adopted.

In order to detect the rotational speed of the motor, a method of calculating the rotational speed from the width of a pulse generated by a rotational speed detection member such as an encoder, which is inserted between the motor and a load, is adopted.

Upon execution of control of the motor rotational speed by the above-mentioned method, when the driving frequency is to be changed, if the rate of change in frequency is increased, then the rotational speed can be changed with quick response. However, when the frequency is close to the resonance frequency, if the frequency is changed at a large rate of change, then the changed frequency often exceeds the resonance frequency, and the motor is stopped, thus disturbing stable rotation.

When the rate of change in frequency is decreased to prevent the changed frequency from exceeding the resonance frequency, the response characteristics in a low rotational speed range of the motor are impaired, and the time required for stopping the motor is undesirably prolonged.

As a method of solving the above-mentioned problem, a conventional device disclosed in Japanese Patent Laid-Open No. 1-283073 proposes the following driving control apparatus for a vibration wave motor. In this apparatus, a monitor electrode for detecting the vibrating state of a vibration wave motor is provided and a phase difference between the output signal from the monitor electrode and a driving AC signal is detected. When the phase difference is large upon a change in rotational speed of the motor, the rate of change in frequency of the driving AC signal is increased to improve response characteristics. On the other hand, when the phase difference is small, the rate of change in frequency of the driving AC signal is decreased to prevent the motor from suddenly stopping due to a driving AC signal frequency lower than the resonance frequency.

However, since the vibration wave motor has characteristics (so-called phase return phenomenon) of exhibiting a signal value almost equal to that in a driving state at the resonance frequency or a frequency near it when the motor is driven in a high-frequency range other than the driving state at the resonance frequency or a frequency near it, the apparatus according to the conventional design erroneously determines that this driving state signal value in the high-frequency driving state is a value at the resonance frequency or a frequency near it, and decreases the rate of change in frequency, thus impairing the response characteristics obtained when the motor is decelerated or stopped.

SUMMARY OF THE INVENTION

One aspect of the present invention is to provide a vibration driven motor which solves the above-mentioned problems by switching the change width of the driving frequency of the vibration driven motor in accordance with the rotational speed of the motor.

Another aspect of the present invention is to provide a vibration driven motor which has a first mode for setting the change width of the driving frequency of the vibration driven motor in accordance with the rotational speed of the motor, and a second mode for setting the change width of the driving frequency of the vibration driven motor in accordance with the driving state (e.g., the resonance state) of the motor, and selects one of the first mode and second mode in accordance with a situation.

Another aspect of the present invention is to provide a vibration driven motor which can selectively switch between the first and second modes in accordance with the driving speed of the motor.

Another aspect of the present invention is to provide a vibration driven motor which can selectively switch between the first and second modes in accordance with the residual driving amount of a member to be driven by the motor.

Other objects of the present invention will become apparent from the following description of preferred embodiments when taken in conjunction with the accompanying drawings.

BRIEF DESCRIPTION OF THE DRAWINGS

FIG. 3, which consists of FIGS. 3A and 3B, is a flow chart showing a control operation by the apparatus according to the first embodiment of the present invention;

FIG. 4, which consists of FIGS. 4A and 4B, is a flow chart showing a control operation by the apparatus according to the first embodiment of the present invention;

FIG. 5, which consists of FIGS. 5A and 5B, is a flow chart showing a control operation by the apparatus according to the second embodiment of the present invention; and FIG. 6, which consists of FIGS. 6A and 6B, is a flow chart showing a control operation by the apparatus according to the second embodiment of the present invention.

DETAILED DESCRIPTION OF THE PREFERRED EMBODIMENTS

First Embodiment

Figure 1:
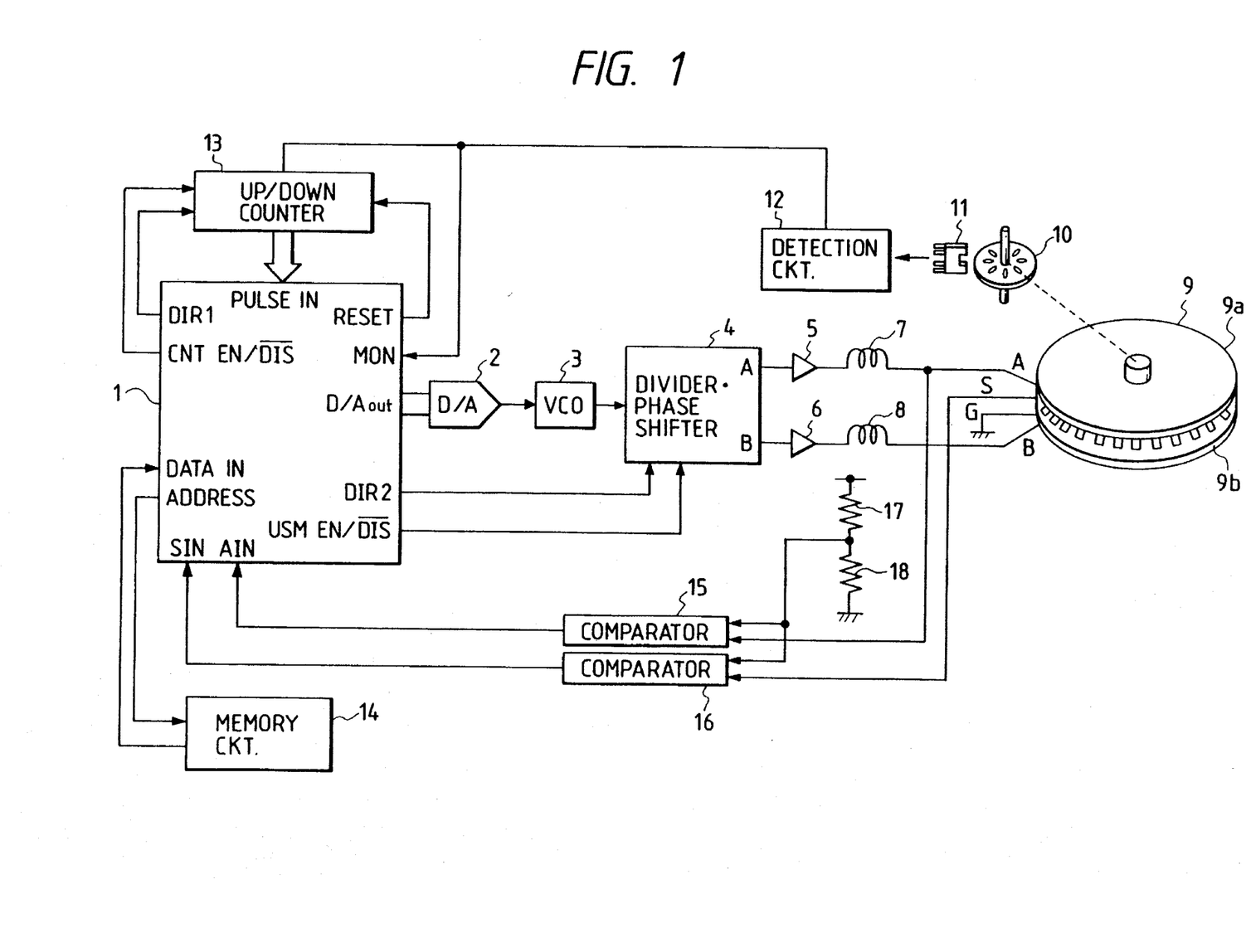
FIG. 1 is a block diagram showing the first embodiment of the present invention.

FIG. 1 is a block diagram showing the first embodiment of the present invention. Referring to FIG. 1, a D/A converter 2 has a function of converting a digital output signal (D/Aout) from a microcomputer 1 into an output voltage. A voltage-controlled oscillator (VCO) 3 outputs a frequency voltage according to the output voltage from the D/A converter 2.

A divider.phase shifter 4 frequency-divides the frequency voltage from the VCO 3 to output a rectangular wave having a π/2 phase difference. Power amplifiers 5 and 6 amplify the frequency voltage from the divider.phase shifter 4 to a voltage and a current value which can drive a vibration wave motor 9.

The vibration wave motor 9 comprises a rotor 9a and a stator 9b. A pulse plate 10 has a plurality of radial slits, as shown in FIG. 1, is coaxial with the shaft of the vibration wave motor 9, and rotates together with the rotor 9a of the vibration wave motor 9. The rotation of the pulse plate 10 is detected by a photointerrupter 11. A signal detection circuit 12 for the photointerrupter 11 amplifies a very small signal from the photointerrupter 11 to convert it into a digital signal (pulse). An up/down counter 13 counts pulse signals generated upon rotation of the pulse plate 10.

A memory circuit 14 stores a program for controlling the driving operation of the vibration wave motor, a speed table upon driving of the vibration wave motor, and the like. Phase comparators 15 and 16 shape the waveforms of a driving AC signal (A phase) and a monitor electrode signal (S phase) into those which can be input to the microcomputer by comparing these signals with reference voltages generated by voltage-dividing resistors 17 and 18.

The respective terminals of the microcomputer 1 will be described below.

An output terminal DIR1 is used for instructing the count direction of the up/down counter 13. When an output from this terminal is "H", it indicates the up direction; when the output is "L", it indicates the down direction for the sake of simplicity. An input terminal PULSE IN receives the count value from the up/down counter 13.

A direct monitor input terminal MON receives the output from the detection circuit 12. A reset output terminal RESET is used for resetting the up/down counter 13. When an output from this terminal is "H", the up/down counter 13 is reset. An output terminal CNT EN/$\overline{\text{DIS}}$ is used for generating a count enable/disable instruction for the up/down counter 13. When an output from this terminal is "H", the count operation is enabled; when an output is "L", the count operation is disabled. An output terminal D/Aout is connected to the D/A converter 2.

An output terminal DIR2 is used for supplying an instruction for changing the phase difference between frequency voltages A and B between 90° and 270°, which voltages are applied to the vibration wave motor to switch the direction of rotation of the vibration wave motor.

A terminal USM EN/$\overline{\text{DIS}}$ is used for turning on/off an output from the divider.phase shifter 4. When an output from this terminal is "H", the output from the divider.phase shifter 4 is turned on; when the output is "L", the output from the divider.phase shifter 4 is turned off. Input terminals AIN and SIN respectively receive waveforms obtained by shaping A and S phase waveforms by the comparators 15 and 16. An output terminal ADDRESS is used for designating an address of the memory circuit 14, i.e., for designating data to be input. An input terminal DATA IN receives data which is stored at the address on the memory circuit 14, which address is designated by the output from the terminal ADDRESS.

The vibration wave motor 9 will be described below with reference to FIG. 2.

Figure 2:
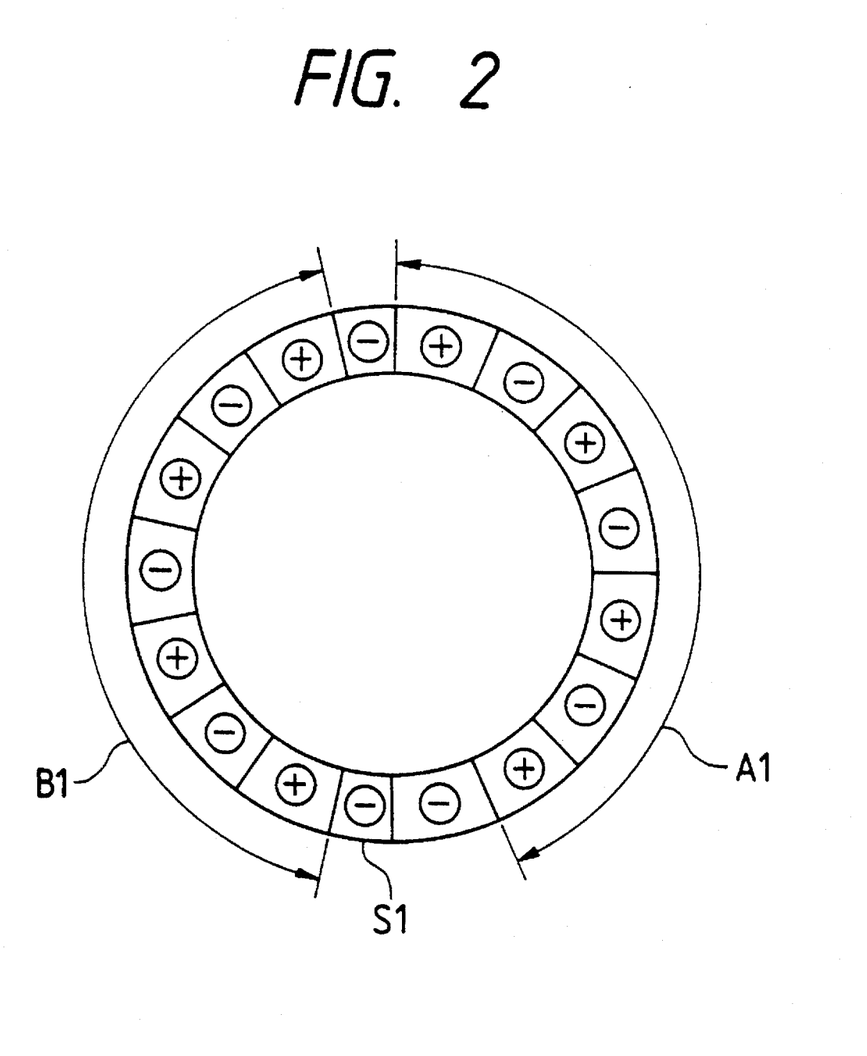
FIG. 2 is an explanatory view for explaining the arrangement state of electrostrictive elements arranged on the rear surface of a stator 9b shown in FIG. 1.

FIG. 2 is an explanatory view showing the arrangement state of electrostrictive elements as electro-mechanical energy converting elements arranged on the rear surface of the stator 9b. Referring to FIG. 2, first and second electrostrictive element groups $A_1$ and $B_1$ are arranged on the stator 9b to have the illustrated phase and polarization relationships therebetween. A sensor electrostrictive element $S_1$ is arranged at a position phase-shifted by 45° from the first electrostrictive element group $A_1$. These electrostrictive elements may be individually attached to a driving member, or may be integrally formed by polarization processing.

Referring back to FIG. 1, driving electrodes A and B are connected to the first and second electrostrictive element groups, and a sensor electrode S is connected to the sensor electrostrictive element $S_1$. When a frequency voltage is applied to the electrode A via the amplifier 5, and a frequency voltage is applied to the electrode B via the amplifier 6, a travelling vibration wave is formed on the rear surface of the stator 9b. When the vibration wave is formed on a vibration member, the sensor electrostrictive element $S_1$ generates an output (frequency voltage) in accordance with the state of this vibration wave, and this voltage is detected by the sensor electrode S. Note that the vibration wave motor has characteristics such that the driving voltage to the electrode A and the output voltage from the sensor electrode have a specific phase relationship therebetween in the resonance state. The resonance state is determined by the phase relationship between the first electrostrictive element group $A_1$ applied with a frequency signal via the electrode A and the sensor electrostrictive element $S_1$. In this embodiment, in a forward rotation state, a resonance state occurs when the phase difference between the signal waveforms of the electrodes A and S becomes 135°; in a reverse rotation state, a resonance state occurs when the phase difference becomes 45°. Also, the phase relationship is shifted as the frequency is shifted from the resonance frequency.

FIGS. 3A, 3B, 4A and 4B are flow charts showing the first embodiment of the present invention, and show a case wherein whether the frequency change width is set based on the phase or the motor speed is selected in correspondence with the absolute speed of the motor. The flow charts in FIGS. 3A, 3B, 4A and 4B are program charts showing a program flow which is stored in the memory circuit 14 shown in FIG. 1, and is processed by the microcomputer 1. The microcomputer 1 executes a control operation in accordance with this program flow.

The operation of the embodiment shown in FIG. 1 will now be described.

When the control circuit enters a vibration wave motor control routine, step 1 is executed. The operations in respective steps will be described below.

Figures 3, 3A:
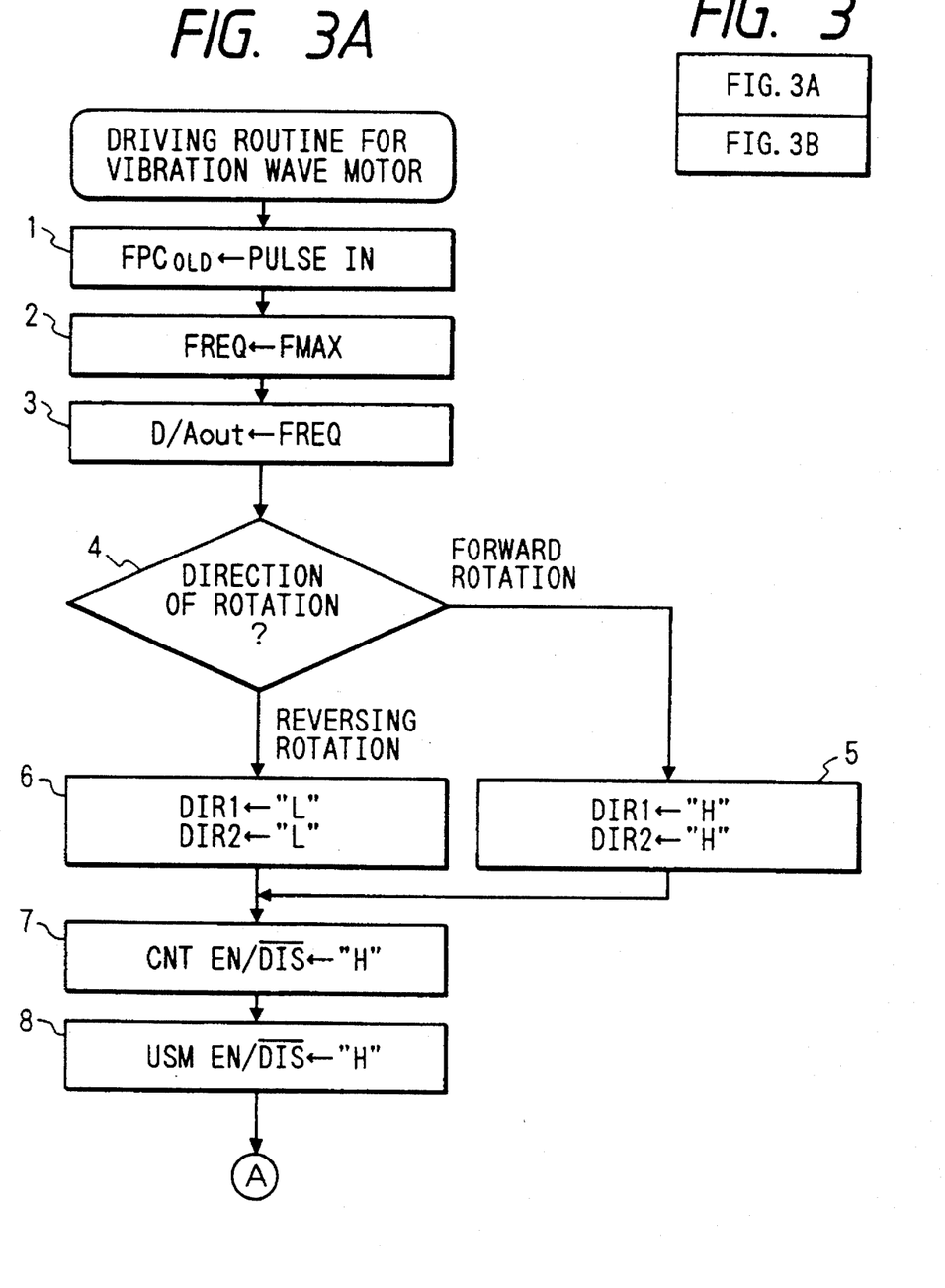

[Step 1] An initial value in the up/down counter 13 is input from the terminal PULSE IN, and is stored in a variable $FPC_{OLD}$.

[Step 2] The value of a variable FMAX is transferred to a variable FREQ. Note that the variable FMAX is an initial frequency determined based on the previous driving frequency. When the motor is normally stopped in the previous driving operation, the variable FMAX stores the frequency at which it was confirmed that the motor began to move; when the motor is stopped in a state such that driving is impossible, the variable FMAX stores 0. These variables FMAX and FREQ store a value to be output to the terminal D/Aout, and as the value becomes smaller, the driving frequency becomes higher.

[Step 3] The value FREQ set in step 2 is output to the terminal D/Aout. Then, the D/A converter 2 converts a digital voltage value output from the terminal D/Aout into an analog voltage, and outputs the analog voltage to the VCO 3. The VCO 3 converts the voltage output from the D/A converter 2 into a frequency, and outputs the frequency to the divider.phase shifter 4.

[Step 4] The driving direction of rotation is determined. If the direction of rotation is the forward direction, then the flow advances to step 5; if the direction of rotation is then the reversing direction, the flow advances to step 6.

[Step 5] Since the driving direction of rotation is the forward direction, a signal "H" is output to the terminal DIR1 to set the count direction of the up/down counter 13 in the up direction. Also, a signal "H" is output to the terminal DIR2 to set a phase difference of 90° between signals A and B to be output from the divider.phase shifter 4. Thereafter, the flow advances to step 7.

[Step 6] Since the driving direction of rotation is the reversing direction, a signal "L" is output to the terminal DIR1 to set the count direction of the up/down counter in the down direction. Also, a signal "L" is output to the terminal DIR2 to set a phase difference of 270° between signals A and B to be output from the divider.phase shifter 4. Thereafter, the flow advances to step 7.

[Step 7] A signal "H" is output to the terminal CNT EN/$\overline{DIS}$ to set the up/down counter 13 in a count enable state.

[Step 8] A signal "H" is output to the terminal USM EN/$\overline{DIS}$ to set outputs A and B of the divider.phase shifter 4 in an enable state. Thus, the divider.phase shifter 4 outputs signals A and B in correspondence with the frequency according to the voltage output from the VCO 3 and the phase difference according to the signal level output from the terminal DIR2. The output signals A and B are amplified by the power amplifiers 5 and 6, and are applied to the vibration wave motor 9 via matching coils 7 and 8. Thus, the vibration wave motor 9 begins rotating.

[Step 9] "0" is stored in a variable TIMER. The variable TIMER serves as a counter for measuring a predetermined period of time when the frequency is lowered after every elapse of the predetermined period of time when no rotation of the motor is detected.

[Step 10] "1" is added to the variable FREQ, and the sum is stored in the variable FREQ.

[Step 11] When the value of the variable FREQ is larger than a minimum frequency MINFREQ within a setting range (when the frequency represented by the value of the variable FREQ becomes lower than the minimum frequency), the flow advances to step 12; otherwise, the flow advances to step 15.

[Step 12] Since no pulse input is detected after the frequency is scanned to MINFREQ in step 11, a driving impossible state is determined, and "0" is stored in the next scan start frequency FMAX.

[Step 13] Since the motor cannot be started, a signal "L" is output to the terminal USM EN/$\overline{DIS}$ to set the outputs A and B of the divider.phase shifter 4 in a disable state. Thus, the motor stops its driving operation.

[Step 14] A signal "L" is output to the terminal CNT EN/$\overline{DIS}$ to set the up/down counter 13 in a count disable state, thus ending the motor driving processing.

[Step 15] The value of the variable FREQ is output to the terminal D/Aout.

[Step 16] The counter value is input from the up/down counter 13, and is stored in a variable FPC.

[Step 17] The variables FPC and $FPC_{OLD}$ are compared with each other. If the two variables are equal to each other, then the flow advances to step 18; otherwise, the flow advances to step 20. More specifically, when the detection circuit 12 detects a rotation operation of the pulse plate 10, and the up/down counter 13 performs a count operation, since $FPC \neq FPC_{OLD}$, the flow advances to step 20. If a rotation operation of the pulse plate 10 is not detected, since $FPC = FPC_{OLD}$, then the flow advances to step 18.

[Step 18] Since a rotation operation of the pulse plate 10 is not detected, the variable TIMER is incremented.

[Step 19] It is checked to see if the value of the variable TIMER is equal to the predetermined time TIME_LMT. If YES in step 19, then the flow returns to step 9; otherwise, the flow returns to step 16.

[Step 20] Since a rotation operation of the pulse plate 10 is detected in step 17, the frequency FREQ at that time is stored in the variable FMAX.

Figure 3B:
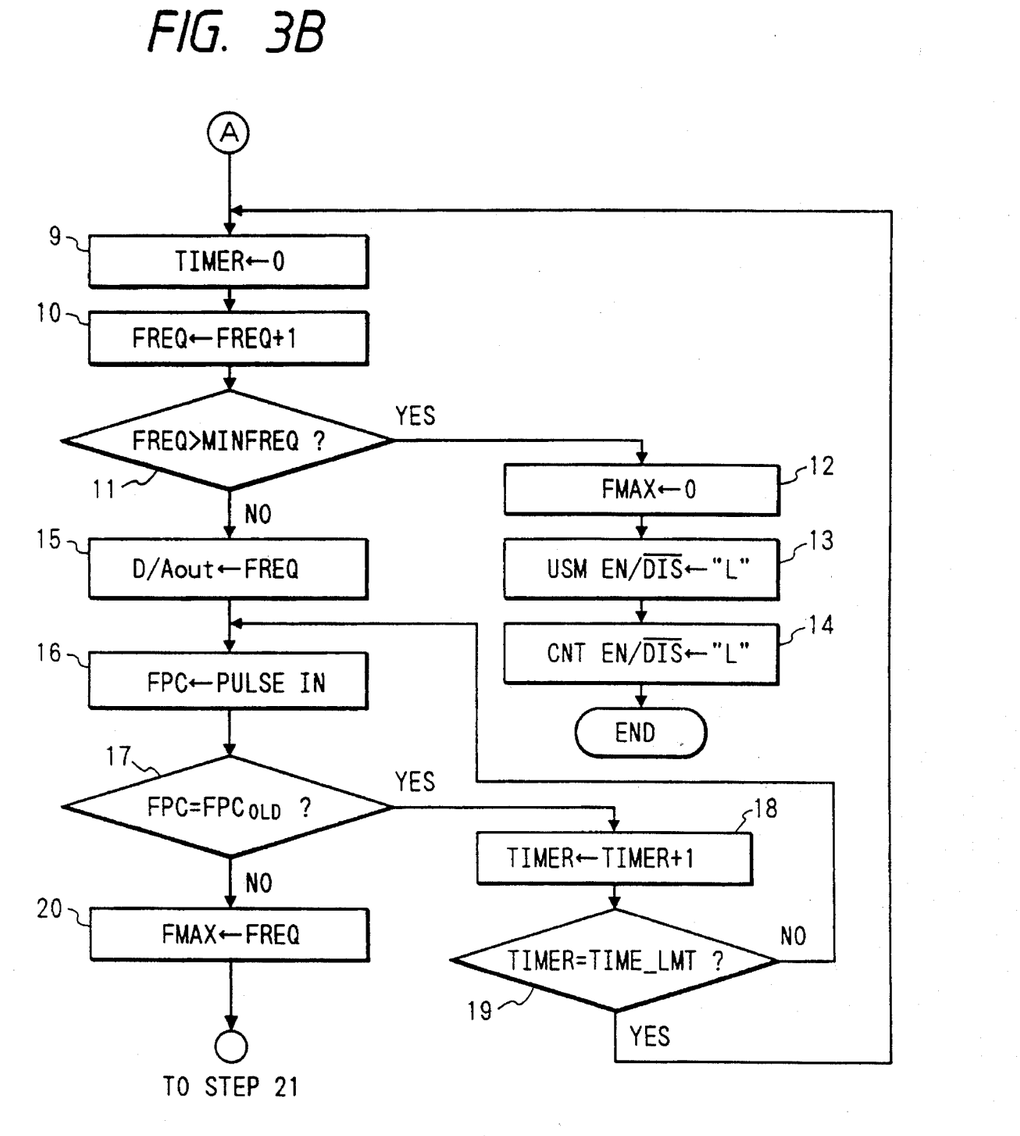

[Step 21] A residual driving amount is calculated from a value corresponding to a target stop position, and the current value of the up/down counter 13. In this step, the same processing as in step 16 is executed. That is, the current count value is input, and the residual driving amount is calculated based on the input value.

[Step 22] The actual speed of the motor is detected by calculating the count frequency of the up/down counter 13. Note that the motor speed may be calculated based on the difference between the current value detected upon each execution of step 21, and the count value detected in the immediately preceding driving operation, or may be calculated based on the input interval of pulses directly input from the terminal MON.

[Step 23] The phase difference between a signal AIN obtained by shaping the waveform of the A phase signal by the comparator 15, and a signal SIN obtained by shaping the waveform of the S phase signal by the comparator 16 is detected.

[Step 24] If the absolute rotational speed of the motor calculated in step 22 is higher than a predetermined value A, then the flow advances to step 25; otherwise, the flow advances to step 32.

Figures 4, 4A:
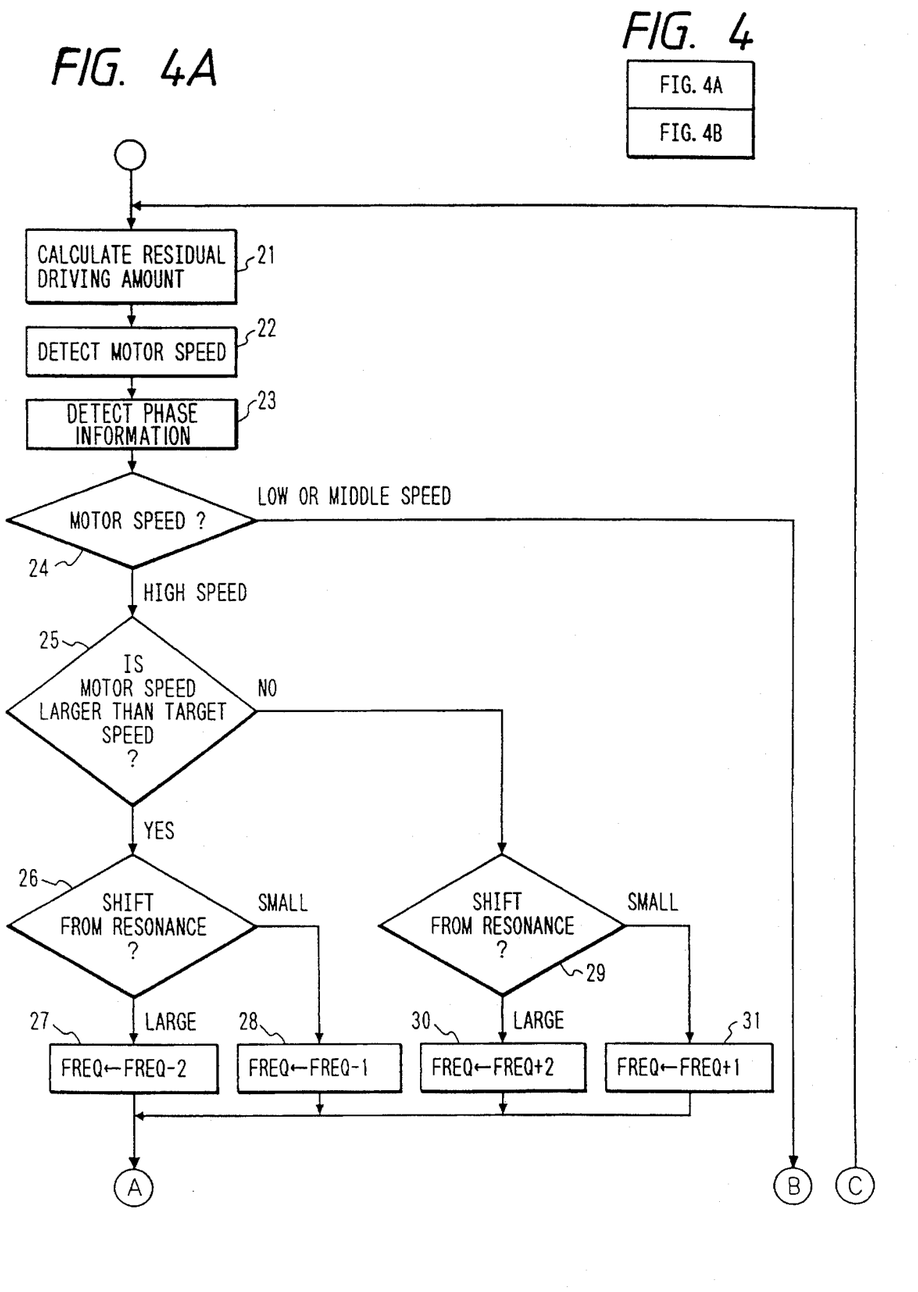

[Step 25] The actual motor speed is compared with a target speed which is pre-stored in the memory circuit 14 based on information such as the residual driving amount. If the actual speed is higher than the target speed, then the flow advances to step 26; otherwise, the flow advances to step 29.

[Step 26] An amount of shift from resonance is determined based on the phase information detected in step 23. If the amount of shift is large, then the flow advances to step 27; otherwise, the flow advances to step 28.

[Step 27] Since the motor speed is higher than the target speed, and the amount of shift from resonance is large, "2" is subtracted from the variable FREQ, and the difference is stored in the variable FREQ, thereby greatly raising the frequency. Thereafter, the flow advances to step 39.

[Step 28] Since the motor speed is higher than the target speed, and the amount of shift from resonance is small, "1" is subtracted from the variable FREQ, and the difference is stored in the variable FREQ, thereby slightly raising the frequency. Thereafter, the flow advances to step 39.

[Step 29] An amount of shift from resonance is determined based on the phase information detected in step 23. If the shift is large, the flow advances to step 30; otherwise, then the flow advances to step 31.

[Step 30] Since the motor speed is lower than the target speed, and the amount of shift from resonance is large, "2" is added to the variable FREQ, and the sum is stored in the variable FREQ, thereby greatly lowering the frequency. Thereafter, the flow advances to step 39.

[Step 31] Since the motor speed is lower than the target speed, and the amount of shift from resonance is small, "1" is added to the variable FREQ, and the sum is stored in the variable FREQ, thereby slightly lowering the frequency. Thereafter, the flow advances to step 39.

Figure 4B:
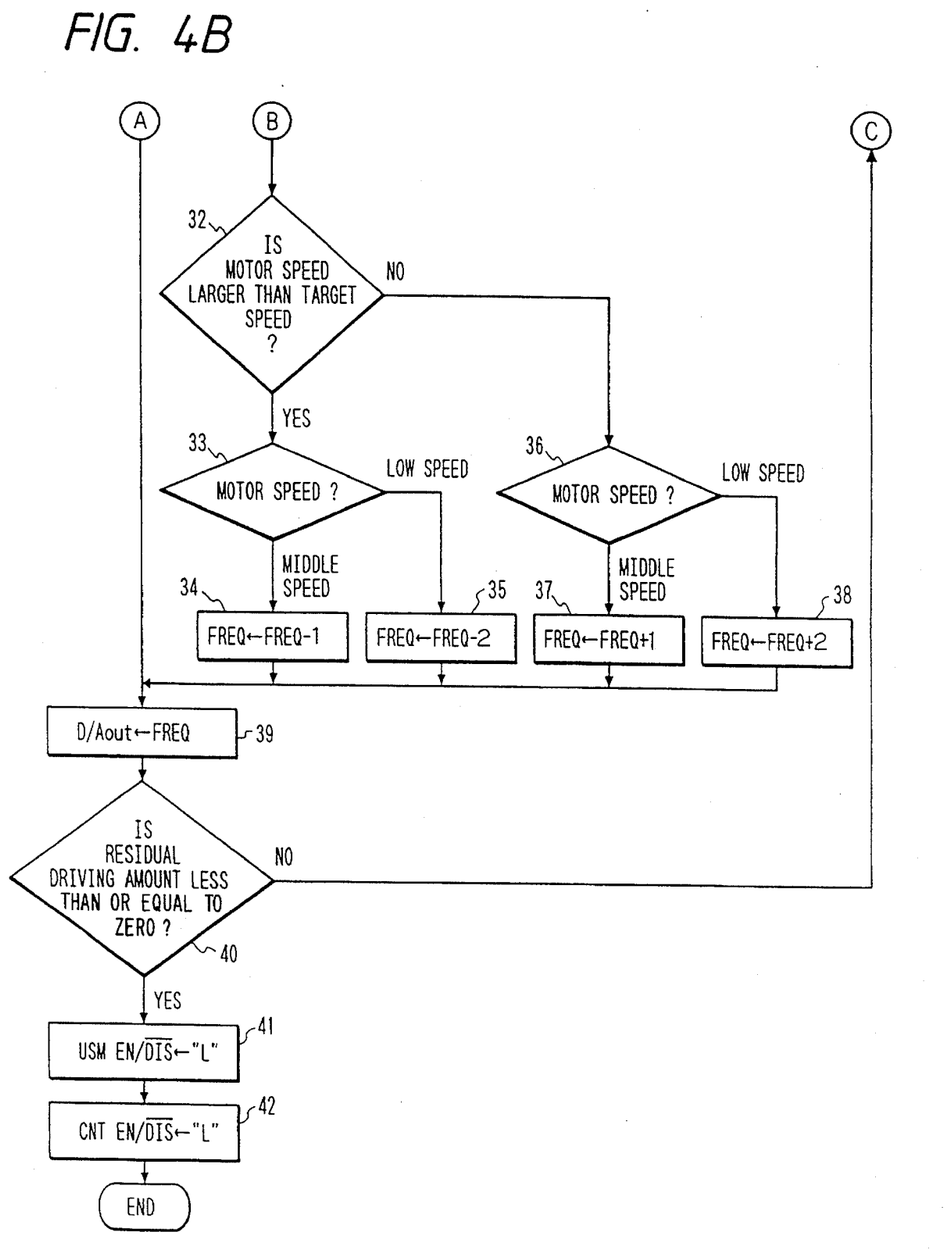
Figures 5, 5A:
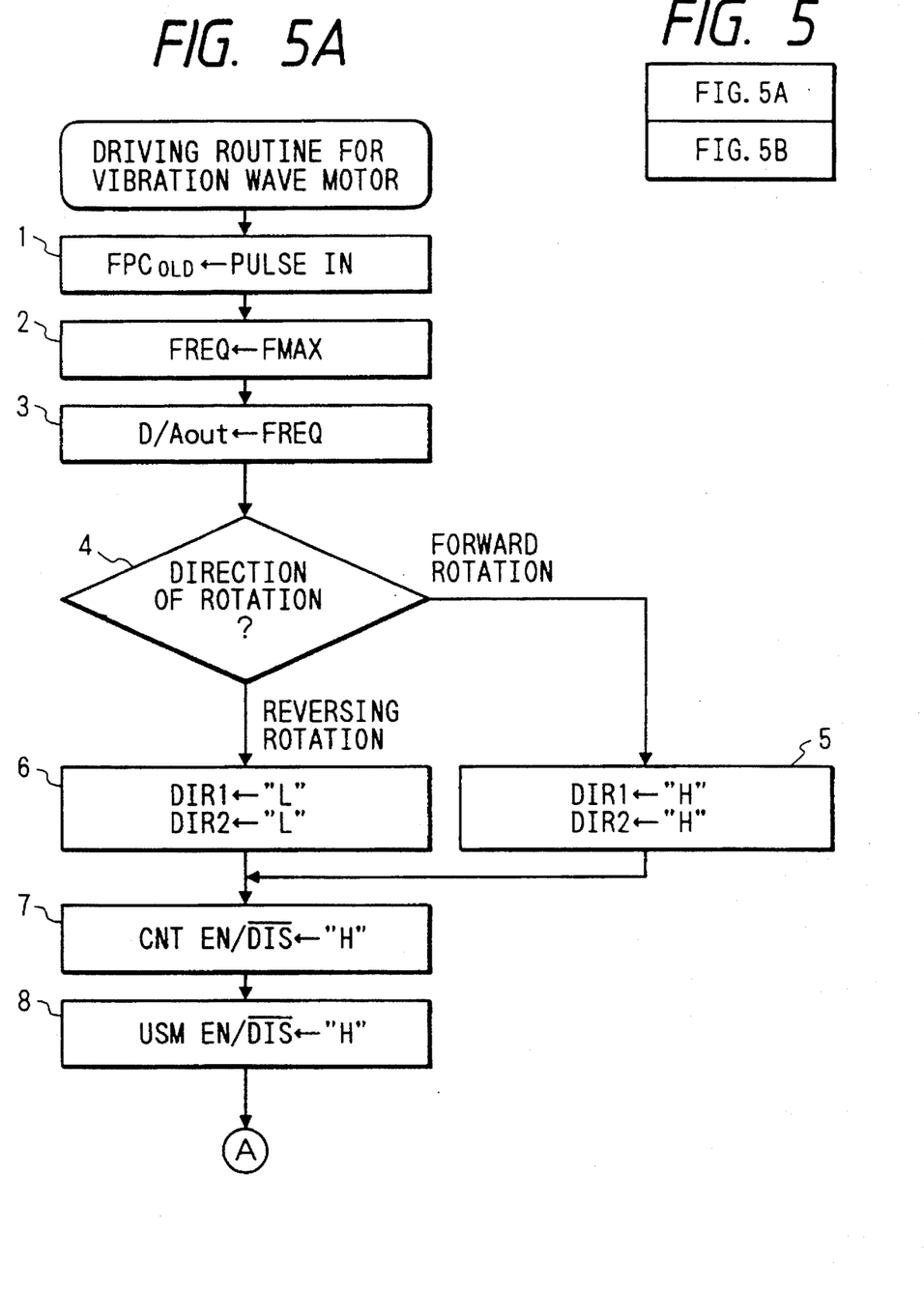
Figure 5B:
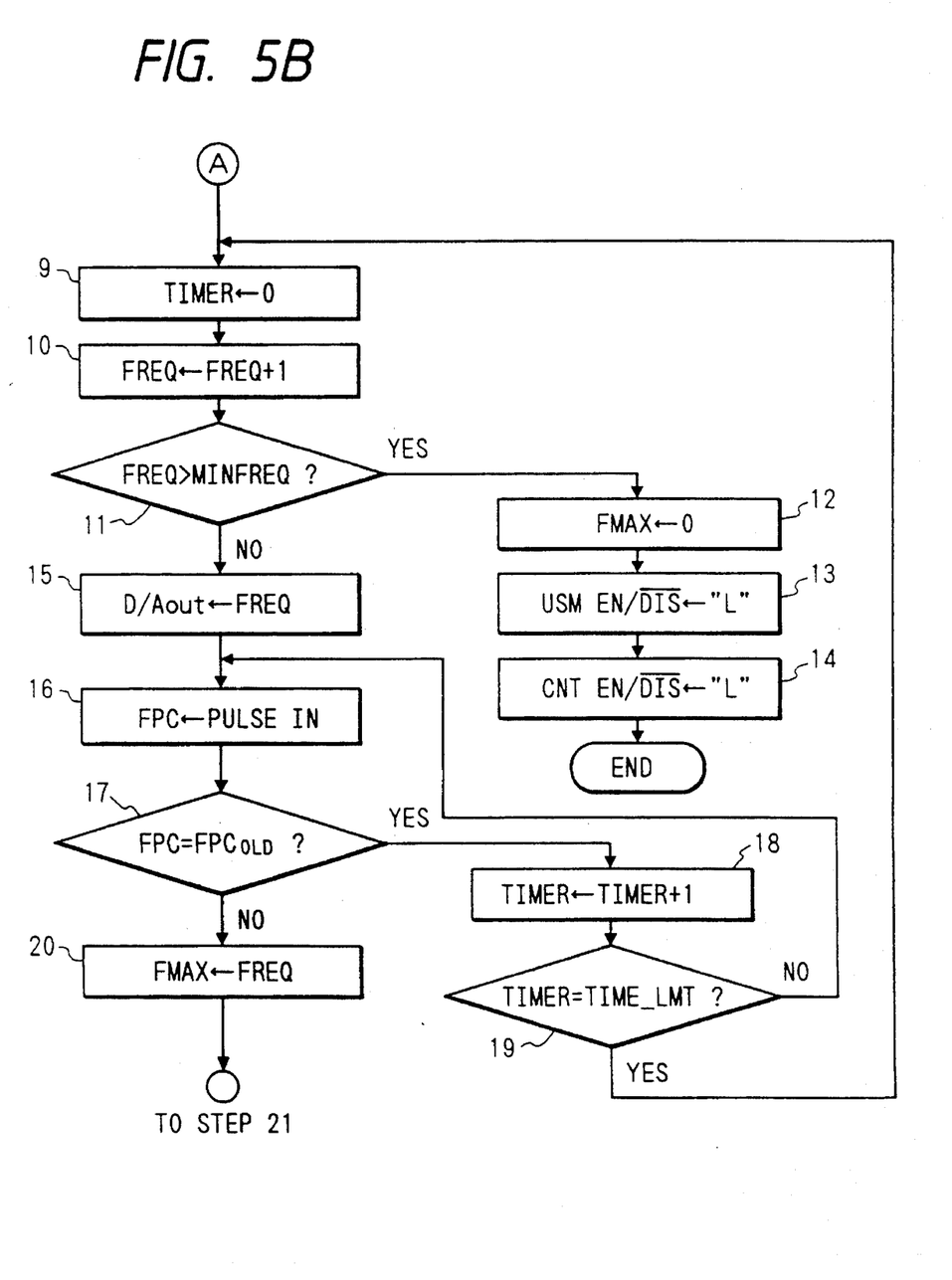
Figures 6, 6A:
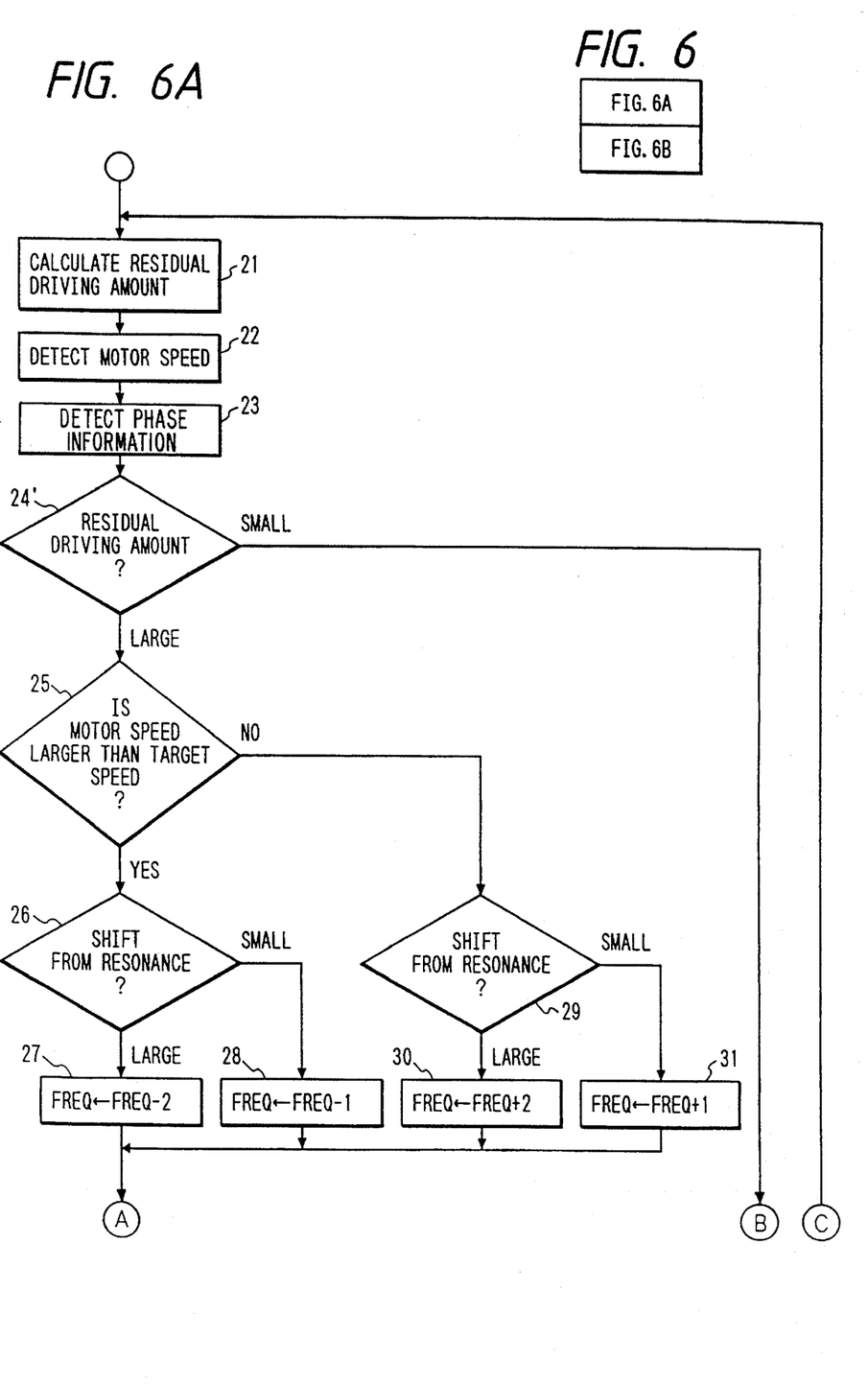
Figure 6B:
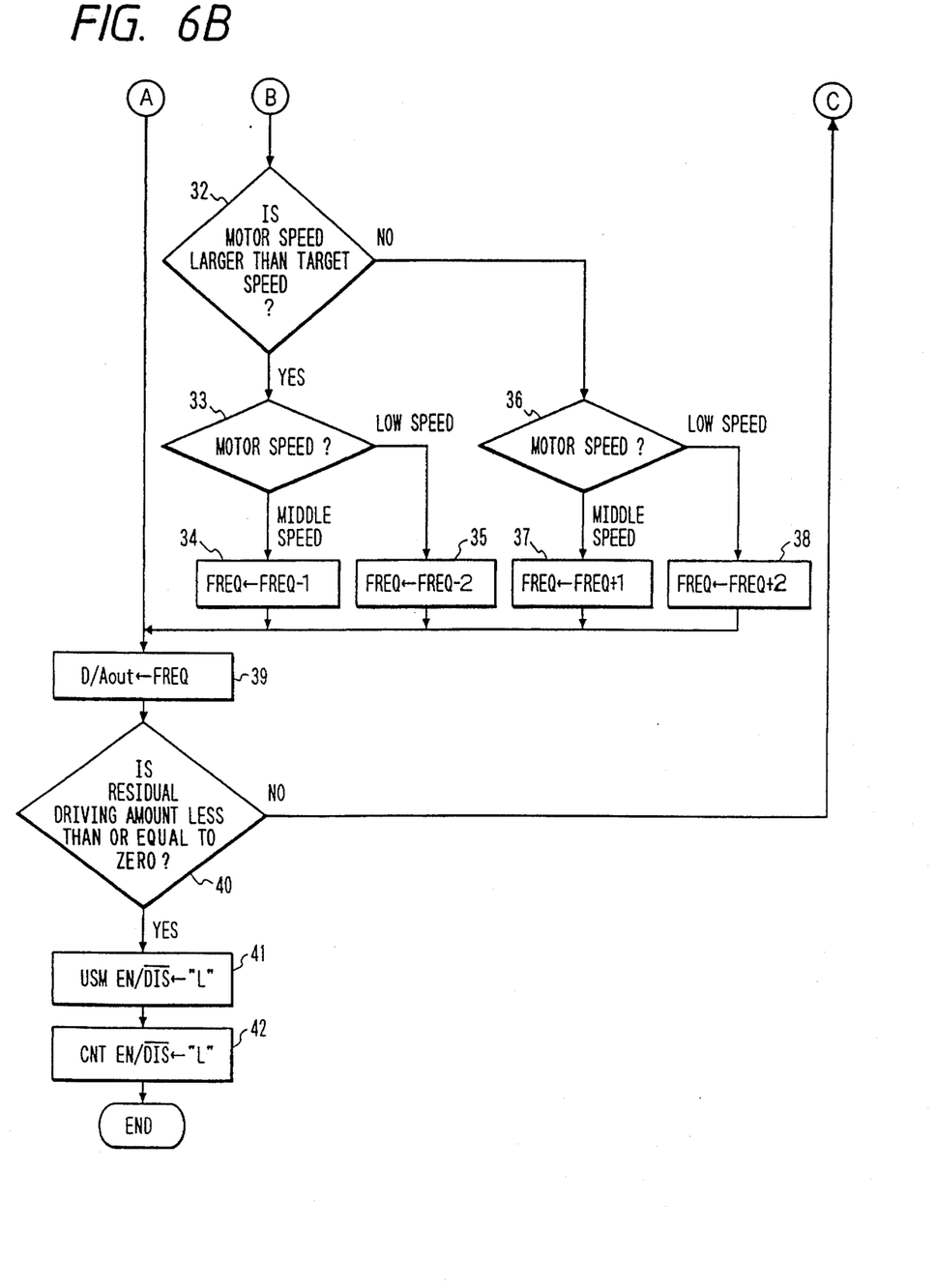

[Step 32] The actual motor speed is compared with a target speed which is pre-stored in the memory circuit 14 based on information such as the residual driving amount. If the actual speed is higher than the target speed, then the flow advances to step 33; otherwise, the flow advances to step 36.

[Step 33] It is checked based on the speed information detected in step 22 if the motor speed is a middle or low speed. If the motor speed is a middle speed, then the flow advances to step 34; otherwise, the flow advances to step 35. In this decision step, if the speed calculated in step 22 is equal to or lower than a predetermined speed A, and is higher than a predetermined speed B, then it is determined that the motor speed is a middle speed; if the calculated speed is equal to or lower than the speed B, then it is determined that the motor speed is a low speed (for A>B).

[Step 34] Since the motor speed is higher than the target speed, and the absolute speed of the motor is a middle speed, "1" is subtracted from the variable FREQ, and the difference is stored in the variable FREQ, thereby slightly raising the frequency. Thereafter, the flow advances to step 39.

[Step 35] Since the motor speed is higher than the target speed, and the absolute speed of the motor is a low speed, "2" is subtracted from the variable FREQ, and the difference is stored in the variable FREQ, thereby greatly raising the frequency. Thereafter, the flow advances to step 39.

[Step 36] It is checked based on the speed information detected in step 22 if the motor speed is a middle or low speed. If the motor speed is a middle speed, then the flow advances to step 37; otherwise, the flow advances to step 38.

[Step 37] Since the motor speed is lower than the target speed, and the absolute speed of the motor is a middle speed, "1" is added to the variable FREQ, and the sum is stored in the variable FREQ, thereby slightly lowering the frequency. Thereafter, the flow advances to step 39.

[Step 38] Since the motor speed is lower than the target speed, and the absolute speed of the motor is a low speed, "2" is added to the variable FREQ, and the sum is stored in the variable FREQ, thereby greatly lowering the frequency. Thereafter, the flow advances to step 39.

[Step 39] The value of the variable FREQ is output to the D/Aout.

[Step 40] It is checked to see if the residual driving amount is larger than 0. More specifically, it is checked whether any residual driving amount still remains, the motor has already been driven by a target driving amount, or the motor has overrun. If any residual driving amount still remains, then the flow returns to step 21; otherwise, the flow advances to step 41.

[Step 41] Since the residual driving amount≦0, i.e., and since the motor has already been driven by a target driving amount or has overrun, a signal "L" is output to the terminal USM EN/DIS to set the outputs A and B of the divider.phase shifter 4 in a disable state. Thus, the motor stops its driving operation.

[Step 42] A signal "L" is output to the terminal CNT EN/DIS to set the up/down counter 13 in a count disable state, thus ending the motor driving processing.

In the above-mentioned operations, an initial setting operation upon starting the motor is performed in steps 1 to 8. That is, the initial state of the up/down counter 13 is checked, a scan start frequency is output, the direction of rotation is determined and set, the variables are initialized, and so on, thus starting the motor.

In steps 9 to 20, it is checked to see if the motor is started, and the frequency scanning operation is performed. In the frequency scanning operation, the frequency is lowered every time the predetermined time TIME_LMT lapses. Before it is confirmed that the motor is started, steps 9→10→11→15→16→17→18→19→16→... are repeated until the predetermined time lapses. When the predetermined time has lapsed, the flow returns from step 19 to step 9, and the frequency is lowered by 1 in step 10.

If it is confirmed in step 17 that the motor is started, then the frequency at that time is stored in step 20. However, when the frequency exceeds the predetermined value MIN-FREQ in step 11 before it is confirmed that the motor is started, a driving impossible state such as an abnormal load state is determined, and the control enters a routine for ending the driving processing in steps 12 to 14.

In steps 21 to 40, the rotational speed of the motor is servo-controlled to the target speed. More specifically, the actual rotational speed of the motor is detected, and is compared with the target speed. When the actual speed is higher than the target speed, the frequency is raised; otherwise, the frequency is lowered. The frequency change width is set in accordance with the absolute rotational speed of the motor and the phase information.

In this embodiment, whether the frequency change width is set based on phase information or the absolute rotational speed of the motor is switched in accordance with the absolute rotational speed of the motor. When the absolute rotational speed of the motor is high, since the phase information is reliable, the frequency change width is set in accordance with the amount of shift from resonance in steps 25 to 31.

On the other hand, when the absolute rotational speed of the motor is low, since the above-mentioned phase return phenomenon occurs, if the frequency change width is set in accordance with amount of the shift from resonance, as in the case wherein the absolute rotational speed of the motor is high, then the resonance state is erroneously determined, and a small frequency change width is undesirably set. As a result, the motor cannot be easily decelerated, and the time required for deceleration or the total driving time is prolonged. For this reason, when the absolute rotational speed of the motor is low, the phase information is considered unreliable, and the frequency change width is set based on the absolute rotational speed of the motor in steps 32 to 38.

In the above description, the frequency change width is set in two stages, i.e., based on phase information or the absolute value of the motor speed. Alternatively, the number of stages may be increased based on the type or performance of the motor or load, or the frequency change width may be set functionally, or may be set on the basis of the difference or ratio between the motor speed and the target speed.

As described above, according to this embodiment, when the motor is rotated at high speed, the frequency change width is decreased based on phase information to eliminate an undesirable vibration; when the motor is rotated at low speed, the frequency change width is increased to achieve a quick deceleration operation, thereby shortening the motor driving time.

Second Embodiment

FIGS. 5A, 5B, 6A and 6B are flow charts showing the second embodiment of the present invention, and show a case wherein whether the frequency change width is set based on the phase or the motor speed is switched based on the residual driving amount to a target stop position.

In this embodiment, the same step numbers denote the same operation steps as those in the flow charts shown in FIGS. 3A, 3B, 4A and 4B. In this embodiment, it is checked in step 24' if the residual driving amount is large or small. If the residual driving amount is large, then the frequency change width is set based on phase information in steps 25 to 31; if the residual driving amount is small, then the frequency change width is set based on the rotational speed of the motor in steps 32 to 38. Other steps are the same as those in the flow charts in FIGS. 3A, 3B, 4A and 4B.

As described above, when the residual driving amount is small, i.e., when the speed is sufficiently low immediately before the stop position, the phase signal is ignored, and the frequency is set based on the motor speed. Therefore, even when the phase return phenomenon occurs, it is prevented from adversely affecting the deceleration characteristics of the motor.

Other driving control operations of the second embodiment are the same as those in the first embodiment.

In the above embodiments, the rotor is driven as a vibration wave motor. A contact member such as a paper sheet which contacts the stator may be driven by a vibration wave generated in the stator, or the rotor may be fixed in position, and the stator itself may be moved. As the electro-mechanical energy converting elements, piezoelectric members may be used, as a matter of course.

What is claimed is:

1. A vibration driven motor or actuator apparatus, comprising:

a vibration member;

an electro-mechanical energy converting element provided at the vibration member, for generating a vibration in the vibration member in response to an applied electrical signal having a driving frequency, the vibration being used as a driving force;

speed detection means for detecting a driving speed of the apparatus;

instruction means for setting an instruction for changing the driving frequency; and driving frequency changing means including a circuit for changing the driving frequency in response to a frequency change instruction from said instruction means, said driving frequency changing means determining a rate of change of the driving frequency in accordance with the driving speed detected by said speed detection means.

2. An apparatus according to claim 1, wherein said driving frequency changing means controls a shift amount of the frequency per unit time in accordance with the detected speed.

3. An apparatus according to claim 1, wherein said driving frequency changing means changes the driving frequency at a first rate of change when the detected driving speed is less than a predetermined value, and changes the driving frequency at a second rate of change smaller than the first rate of change when the detected driving speed is equal to or greater than the predetermined value.

4. An apparatus according to claim 2, wherein said driving frequency changing means changes the driving frequency by a first shift amount when the detected driving speed is less than a predetermined value, and changes the driving frequency by a second shift amount smaller than the first shift amount when the detected driving speed is equal to or greater than the predetermined value.

5. A vibration driven motor or actuator apparatus, comprising:

a vibration member;

an electro-mechanical energy converting element provided at the vibration member, for generating a vibration in the vibration member in response to an applied electrical signal having a driving frequency, the vibration being used as a driving force;

speed detection means for detecting a driving speed of the apparatus;

instruction means for setting an instruction for changing the driving frequency;

driving state detecting means for detecting an amount of shift from a resonance drive state of the apparatus;

a driving frequency changing circuit for changing the driving frequency of the applied electrical signal in response to a frequency change instruction from said instruction means, and operable in a first mode and a second mode, wherein in the first mode said driving frequency changing circuit changes the driving frequency at a rate corresponding to the amount of shift from the resonance state detected by said driving state detection means, and wherein in the second mode said driving frequency changing circuit changes the driving frequency at a rate corresponding to a driving speed detected by said speed detection means; and a mode selection circuit for selecting one of the first and second modes.

6. An apparatus according to claim 5, wherein said mode selection circuit selects one of the first mode and the second mode in accordance with the detected driving speed.

7. An apparatus according to claim 5, wherein said mode selection circuit selects the first mode when the detected driving speed is greater than a predetermined value, and selects the second mode when the detected driving speed is equal to or less than the predetermined value.

8. An apparatus according to claim 5, wherein said mode selection circuit selects one of the first mode and the second mode in accordance with a residual amount to a target driving amount of a movable member driven by said apparatus.

9. An apparatus according to claim 8, wherein said mode selection circuit selects the first mode when the residual amount is greater than a predetermined value, and selects the second mode when the residual amount is equal to or less than the predetermined value.

10. A vibration driven apparatus, comprising:

a vibration member;

an electro-mechanical energy converting element provided at said vibration member, for generating a vibration in the vibration member in response to an applied electrical signal having a driving frequency, the vibration being used as a driving force;

speed detection means for detecting a driving speed of the apparatus;

driving state detection means for detecting an amount of a shift from a resonance drive state of the apparatus;

instruction means for setting an instruction for changing the driving frequency;

a driving frequency changing circuit for changing the driving frequency of the applied electrical signal in response to a frequency change instruction from said instruction means, and operable in a first mode and a second mode, wherein in the first mode said driving frequency changing circuit changes the driving frequency at a rate corresponding to the amount of shift from the resonance state detected by said driving state detection means, and wherein in the second mode said driving frequency changing circuit changes the driving frequency at a rate corresponding to a driving speed detected by said speed detection means; and mode selection means for selecting the first mode or the second mode in accordance with a speed detected by said speed detection means.

11. An apparatus according to claim 10, wherein said mode selection means selects the first mode when the detected driving speed is greater than a predetermined value, and selects the second mode when the detected driving speed is equal to or less than the predetermined value.

12. An apparatus according to claim 11, wherein said drive frequency changing circuit changes the driving frequency at a rate corresponding to a detected shift from the resonance drive.

13. An apparatus according to claim 10, wherein said mode selection circuit selects one of the first mode and the second mode in accordance with a residual amount to a target driving amount of a movable member driven by said apparatus.

14. An apparatus according to claim 13, wherein said mode selection means selects the first mode when the residual amount is greater than a predetermined value, and selects the second mode when the residual amount is equal to or less than the predetermined value.

15. An apparatus according to claim 14, wherein said drive frequency changing circuit changes the driving frequency at a rate corresponding to a detected shift from the resonance drive.

16. A vibration driven apparatus, comprising:

a vibration member;

an electro-mechanical energy converting element provided at said vibration member, for generating a vibration in the vibration member in response to an applied electrical signal having a driving frequency, the vibration generated in the vibration member being used as a driving force;

a detection circuit for detecting an amount remaining between a present driving amount and a target driving amount;

a vibration state detector for detecting a vibration state of the vibration member;

a frequency adjusting circuit, operable in a first mode and a second mode, for adjusting the driving frequency of the applied electrical signal, wherein in the first mode said frequency adjusting circuit adjusts the driving frequency of the applied electrical signal based on a detected vibration state of the vibration member, and wherein in the second mode said frequency adjusting circuit adjusts the driving frequency of the applied electrical signal independently of the detected vibration state of the vibration member; and a selection circuit for selecting one of the first mode and the second mode based on the amount detected by said detection circuit.

17. A vibration driven apparatus, comprising:

a vibration member;

an electro-mechanical energy converting element provided at said vibration member, for generating a vibration in the vibration member in response to an applied electrical signal having a driving frequency, the vibration generated in the vibration member being used as a driving force;

a detection circuit for detecting an amount remaining between a present driving amount and a target driving amount;

a frequency adjusting circuit, operable in a first mode and a second mode, for adjusting the driving frequency of the applied electrical signal, wherein in said first mode said frequency adjusting circuit performs a first frequency adjusting operation, and in said second mode said frequency adjusting circuit performs a second frequency adjusting operation different from said first frequency adjusting operation; and a selection circuit for selecting either the first mode or the second mode based on the amount detected by said detection circuit.

* * * * *

UNITED STATES PATENT AND TRADEMARK OFFICE
CERTIFICATE OF CORRECTION

PATENT NO. : 5,616,979
DATED : April 1, 1997
INVENTOR(S) : FUMIKAZU NISHIKAWA

It is certified that error appears in the above-identified patent and that said Letters Patent is hereby corrected as shown below:

COLUMN 1

Line 61, "provided" should read --provided,--.

COLUMN 6

Line 7, "then the flow" should read --the flow then--.
Line 64, "then the flow" should read --the flow then--.

Signed and Sealed this

Fourteenth Day of October, 1997

*Attest:*

BRUCE LEHMAN

*Attesting Officer*    *Commissioner of Patents and Trademarks*